(12) United States Patent
Tang et al.

(10) Patent No.: US 6,568,055 B1
(45) Date of Patent: May 27, 2003

(54) ARBOR CLAMPING APPARATUS FOR BORING AND MILLING MACHINES

(75) Inventors: Kou-Yu Tang, Hsinchu (TW); Lei-Yi Chen, Hsinchu Hsien (TW); Wen-Rey Wang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/093,494

(22) Filed: Mar. 11, 2002

(30) Foreign Application Priority Data

Dec. 18, 2001 (TW) ...................... 90222197 U

(51) Int. Cl.[7] .............. B23Q 3/12; B23C 1/00; B23B 31/10
(52) U.S. Cl. ............ 29/26 A; 408/239 R; 409/231
(58) Field of Search ............... 29/26 A, 27 C, 29/27 R; 409/232, 234, 223, 231; 408/239 R, 239 A, 238

(56) References Cited

FOREIGN PATENT DOCUMENTS

| DE | 3727525 | * | 7/1988 | ............. 409/231 |
| JP | 4176504 | | 6/1992 | |
| JP | 7-185984 | * | 7/1995 | ............. 409/234 |
| JP | 8197304 | | 8/1996 | |

* cited by examiner

Primary Examiner—William Briggs
(74) Attorney, Agent, or Firm—Rabin & Berdo, P.C.

(57) ABSTRACT

An arbor clamping apparatus providing a steady way for clamping boring arbor and improves structure rigidity and boring accuracy for boring and milling machines. The milling arbor of the present invention is designed and characterized by two steps spindles and includes the first step spindle used mainly to clamp a boring arbor and to hold large cutting tools and fixtures, and the second step spindle designed principally to support and contain the boring arbor. With the first step spindle a clamping mechanism is established and includes a hydraulic cylinder, a piston and movable wedges. Hydraulic force is applied through the action of the piston to drive the wedges to move between the boring and milling arbors and hence the clamping for a boring arbor is achieved through the approaching action of the wedges.

17 Claims, 3 Drawing Sheets

ARBOR CLAMPING APPARATUS FOR BORING AND MILLING MACHINES

BACKGROUND OF THE INVENTION

The present invention relates to a structure design of arbors for boring and milling machines and especially relates to a clamping apparatus that pushes wedges to clamp a boring arbor of a boring and milling machine that use hydraulic force.

Conventional boring and milling machines possess double-layer arbors. These are a milling arbor, and a boring arbor located in the center position of the milling arbor respectively. The boring arbor can make reciprocating motions along the axial direction of the milling arbor so that boring processes can be performed with different depths. Conventionally, two guiding rings are positioned inside the milling arbor which support the boring arbor in sequence. The guiding rings act as a guiding element for the boring arbor when the boring arbor moves. This kind of arbor-setup causes some problems when it is in use: if the stroke of the boring arbor is too large, the nose of the boring arbor will bend down and the associated structure rigidity will not be sufficient. Therefore, the accuracy of the boring processes can be seriously decreased. In an attempt to overcome these problems, different apparatuses for clamping arbors of boring and milling machines were developed, with the principal aim being to tighten the boring arbor so that bending of the boring arbor can be decreased, while increasing the associated structure rigidity of the boring arbor when the boring arbor moves to the required position.

Existing apparatuses for clamping arbors, for example the one proposed by the Japan Patent JP4-176504, comprise principally a hydraulic cylinder and a coned-disk spring placed among the main bearings of the arbors. The operating principles of this arbor clamping apparatus described above are clarified hereinafter: firstly the wedges are automatically pressed by the force induced by the coned-disk spring to tighten the boring arbor. The coned-disk spring and the wedges will be drawn back by the action of the hydraulic cylinder when the boring arbor starts to slide along the axial direction, and then the feed motion of the boring arbor will begin. But this kind of design causes also some problems when it is in use: the friction the O-rings, located between the boring and milling arbors, affects the feeding accuracy of the boring arbor. Further, it is also more difficult to feed hydraulic oil into the hydraulic cylinder when the hydraulic cylinder is placed between the boring and milling arbors and when the boring arbor rotates at high speed.

Another type of arbor clamping apparatus, for example the one proposed by the Japan Patent JP8-197304, is characterized in that the hydraulic cylinder used to clamp the boring arbor is settled in a fixed seat. This fixed seat does not move so that hydraulic oil can be fluently fed into the hydraulic cylinder. A set of bearings is provided, with the piston being positioned inside the hydraulic cylinder. The clamping force induced by the hydraulic cylinder is transmitted by the bearings to the wedges placed among the rotary boring and milling arbors, and is applied together with the reciprocating motion of the hydraulic cylinder to clamp or to slacken the boring arbor. This design has virtually solved the problems caused by the design of the Japan Patent JP4-176504; for example, the advantages of this design are that the inlet for the hydraulic oil source is settled inside the fixed seat such that there is no need to seal the hydraulic oil source at high speed and high pressure surroundings. Of course, at the same time, the O-Rings have also no influence on the feeding accuracy of the boring arbor. But on the other hand, the design of the Japan Patent JP8-197304, also causes some problems; for example, because the hydraulic cylinder is additionally included and occupies the front location of the milling arbor, cutting tools cannot be placed as usual on the front location of the milling arbor.

SUMMARY AND OBJECTS OF THE INVENTION

The principal aim of the present invention is to provide an improved arbor structure for boring and milling machines and the associated clamping apparatus for use in clamping arbors, such that cutting tools of milling can as usual be settled and used while at the same time the problems of low boring accuracy, insufficient structure rigidity and bend of the boring arbor can also be overcame.

The milling arbor proposed by the present invention for boring and milling machines is designed and characterized by two steps spindles, said milling arbor is composed of these two steps spindles wherein the second step spindle is mainly applied to support the boring arbor placed in the center of it, while a hydraulic clamping mechanism is provided with the first step spindle and possesses a fixed shell fixed with the primary body housing of boring and milling machines. Furthermore this fixed shell encloses the outside region of the first step spindle and hence forms a hydraulic chamber. Inside this hydraulic chamber, a piston is established and just by a bearing so the motion of the piston is transmitted to the bearing then to a driving element and this driving element pushes a wedge to move along the axial direction of the boring arbor. Via the approaching action between the boring arbor and the wedge placed among the milling and boring arbors, the clamping for boring arbor is achieved. By the design proposed by the present invention not only the hydraulic driving force can be applied to push the wedges to tighten the boring arbor, but also some tap holes and slots can be provided on the front location of the first step spindle such that large cutting tools of milling and fixtures can be established and utilized.

Further detailed technical setups and embodiments of the present invention are described together with the drawings as follows.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description herein below illustration only, and thus are not limitative of the present invention. Specific embodiments of the invention are now described with reference to the accompanying drawings, wherein.

DETAILED DESCRIPTION OF THE INVENTION

Figure 1:
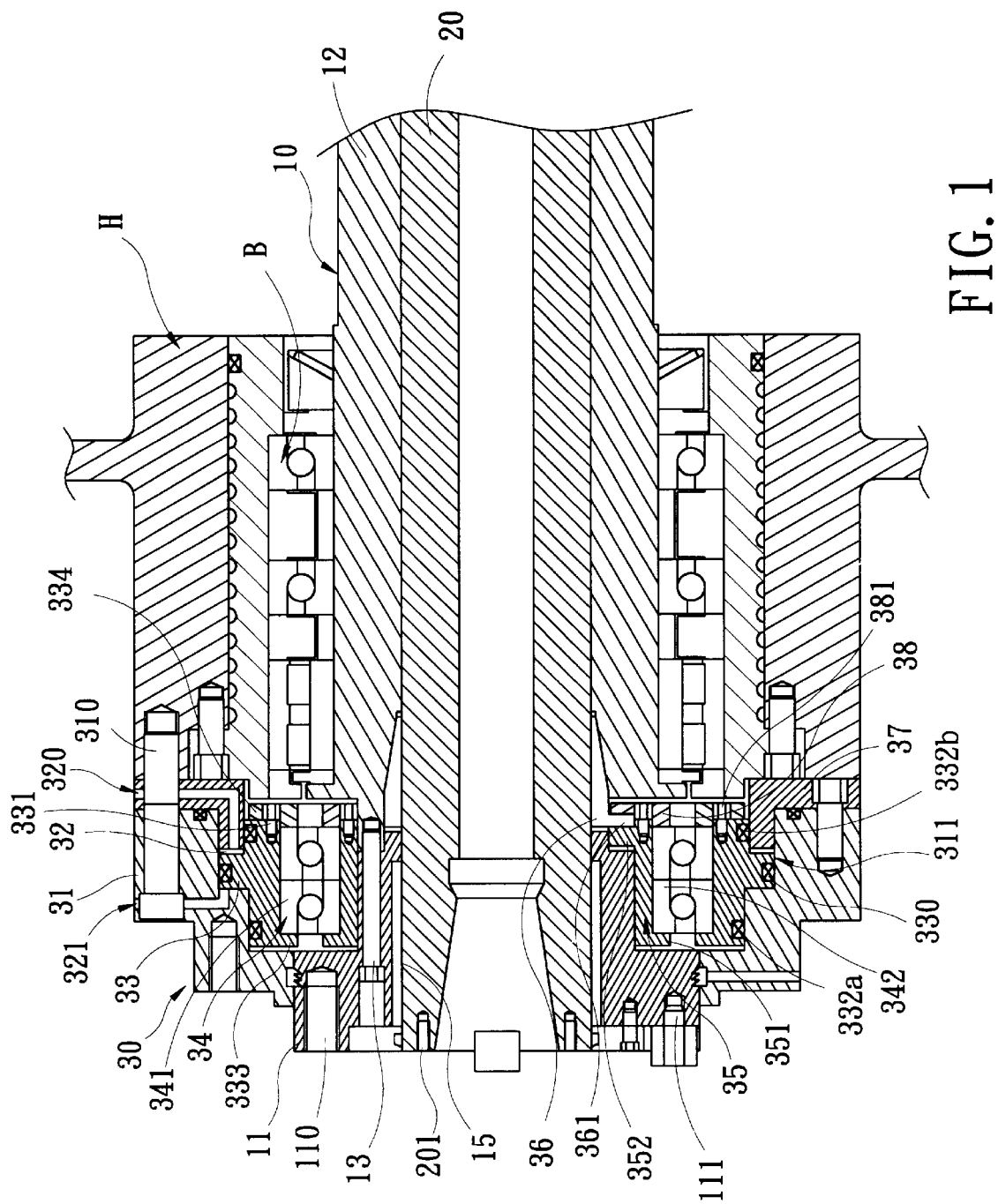
FIG. 1 illustrates the structural cross-sectional elevation of the present invention.

Referring firstly to FIG. 1, there is shown a first embodiment of the arbor clamping apparatus for boring and milling machines of the present invention. The arbor clamping apparatus comprises a hollow milling arbor 10 positioned inside the primary body housing H of the boring and milling machine arbor 10 is supported by several main bearings B located between the primary body housing H and the milling arbor 10. The end part of the milling arbor 10 is connected with the drive mechanism (not shown in FIG. 1) of the boring and milling machine, while the head part of the milling arbor 10 protrudes out of the primary body housing H. On the head part of the milling arbor, some tap holes 110 and slots 111 are established so that large cutting tools of milling (for example, cutting tool for plane milling) and fixtures can be settled.

A boring arbor 20 is settled in the center position of the hollow milling arbor 10 and can move along the axial direction of the milling arbor 10, and can also rotate at the same speed with the milling arbor 10 such that boring processes with different depths can be accomplished. On the head part of the boring arbor 20 some tap holes 201 are also established so that cutting tools of boring can be settled.

A clamping mechanism 30 includes a fixed shell 31 which is fixed with the primary body housing H of the boring and milling machine. This fixed shell 31 encloses the outside region of the milling arbor 10 and hence forms a hydraulic chamber 32. Inside this hydraulic chamber 32, a piston 33 is established and the movements of the piston 33 are transmitted by a bearing 34 to a driving element 35, such that some wedges 36 are pushed to move along the axial direction of the boring arbor 20. Via the approaching action between the boring arbor 20 and the wedges 36 placed among the milling and boring arbors 10, 20, the clamping for the boring arbor 20 is achieved.

Figure 2:
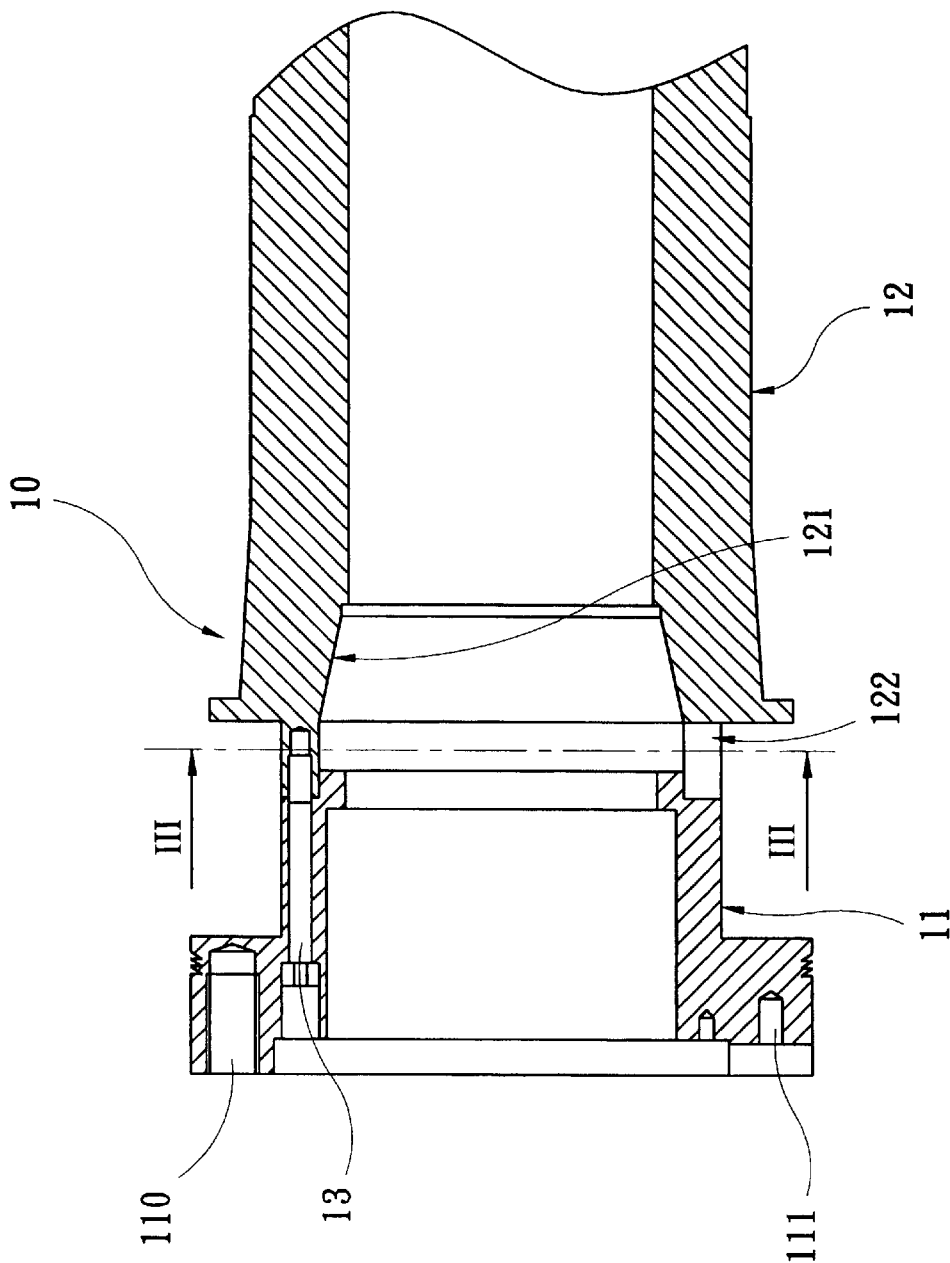
FIG. 2 illustrates the structural cross-sectional elevation of the milling arbor.
Figure 3:
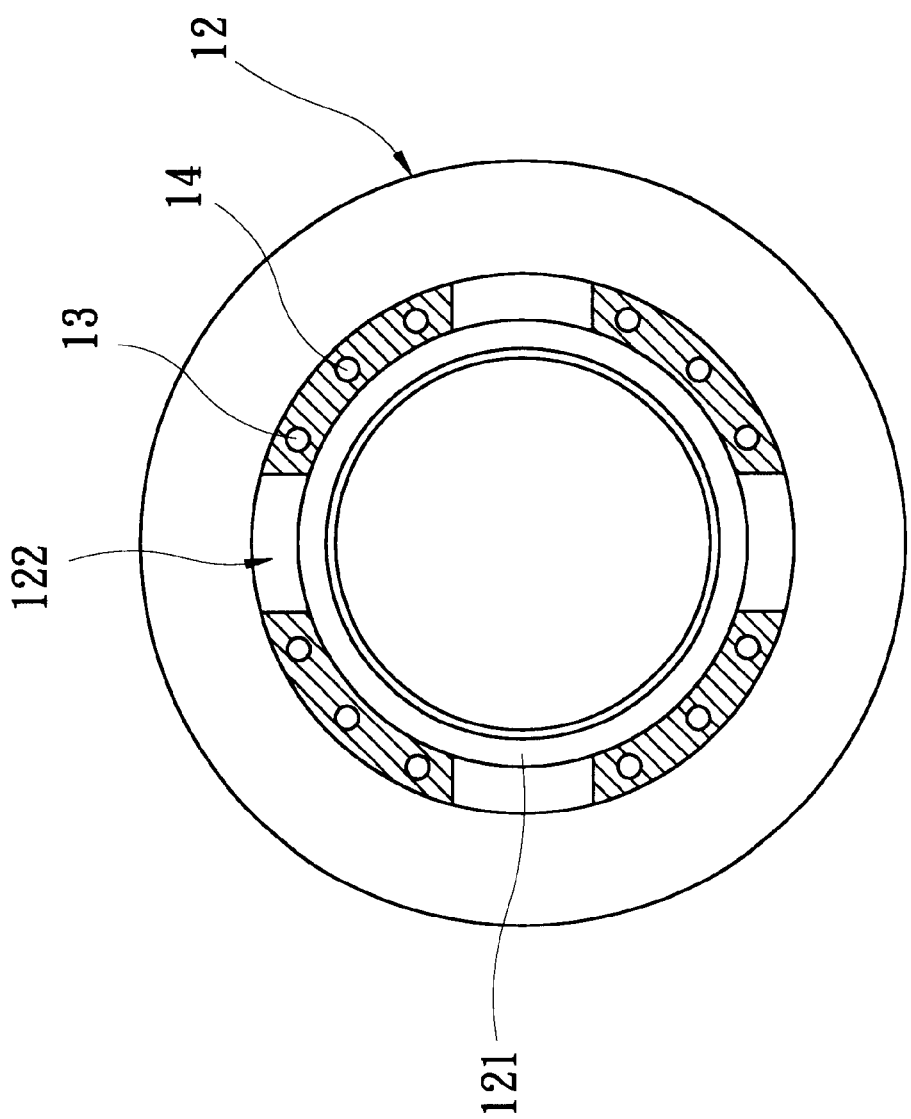
FIG. 3 illustrates the cross-sectional elevation of FIG. 2 along III—III cross-section.

Referring to FIG. 2, the milling arbor 10 of the present invention is designed and characterized by two step spindles and comprises a second step spindle 12 used mainly to support and contain the boring arbor 20, and a first step spindle 11 applied principally to hold large cutting tools and fixtures. The first step spindle 11 is connected with the second step spindle 12 by several screws 13 and taper pins 14 (referring to FIG. 3) so that after the combination, the structure rigidity of the milling arbor 10 can still be maintained and is still sufficient to hold large cutting tools and fixtures which are settled on one of the end parts of the first step spindle 11. On a location nearby the connection part between the first and second step spindles 11, 12, the inner wall of the second step spindle 12 is formed to have a tapered inner wall 121. This inner wall 121 is characteristically formed to have a larger diameter on the side nearby the first step spindle 11, and has a smaller diameter on the other side. Some of the wedges 36, which are described above, are just settled between the boring arbor 20 and this tapered inner wall 121. The approaching action of these wedges 36 can be applied to tighten the boring arbor 20 when the wedges approach the boring arbor 20 in the gap between the tapered inner wall 121 and the boring arbor 20. From FIG. 3 it is fully understood, that there are some breaches 122 stretching along the axial direction on the connection part of the second step spindle 12 and the first step spindle 11. The wedge 36 possesses a tail hook 361 stretching toward the radial direction of the milling arbor 10 on one of its end parts. The tail hook 361 is coupled with the driving element 35 just in the breach 122, so that the driving element 35 can fluently and effectively push the wedge 36 to move. A sliding bearing 15 (for example, a self-lubricated bearing with oil) is settled on the inner wall of the first step spindle 11 and is applied to provide the boring arbor 20 with precise guidance and a stable support as the boring arbor 20 takes the feed motion along the axial direction of the milling arbor 10. On the same principle, another sliding bearing is also settled on the inner wall of the second step spindle 12 (not shown in FIG. 3) such that it supports the boring arbor 20 together with the sliding bearing 15 positioned inside the first step spindle 11 symmetrically and provides the boring arbor 20 with a precise guidance.

The fixed shell 31 of the clamping mechanism 30 is an annular element and is settled and fixed by some screws 310 on the side part of the primary body housing H of the boring and milling machine. Fixed shell 31 encloses the outside region of the first step spindle 11 of the milling arbor 10 and hence just forms an available space inside it. Some elements are placed inside this space and are described herein below.

A hydraulic chamber 32 is an annular space which is defined by a slot 311 placed around the inner wall of the fixed shell 31 and is connected with a hydraulic oil supply source by two hydraulic oil pipes 320 and 321 which are settled at the two axial end parts of the hydraulic chamber 32. In order to accomplish this hydraulic chamber 32, an annular end covering plate 37 is established between the fixed shell 31 and the primary body housing H. One side of the hydraulic chamber 32 is just specified by this annular end covering plate 37 and one of the oil pipes 320 is disposed inside this annular end covering plate. A piston 33 is substantially also an annular element and is just settled in the hydraulic chamber 32 and can take reciprocating motion along the axial direction of the milling arbor 10 in the hydraulic chamber 32. Between the piston 33 and the fixed shell 31, a first O-Ring 330 is established to surround the piston 33. The first O-Ring 330 is applied by the piston 33 to divide the hydraulic chamber 32 into two isolated pressure chambers. The piston 33 is settled on the inner wall of the fixed shell 31, and the hydraulic chamber 32 is sealed by some second O-Rings 332a and 332b placed between the piston 33 and the fixed shell 31. The piston 33 possesses a stretching rib 333 on its side toward the axial direction of the milling arbor 10, and on the other side, an annular lid 334 is settled and fixed with it by some bolts 331, so that the annular lid 334 and the piston 33 can be combined and regarded as a rigid body. The annular lid 334 and the stretching rib 333 hold the outer ring ball race 341 of the bearing 34 completely tight such that the bearing 34 and the piston 33 are associated with each other, and therefore the bearing 34 can be prevented from sliding along the axial direction of the milling arbor 10.

The bearing 34 of the clamping mechanism 30 is established on the side toward the milling arbor 10 of the piston 33 (i.e., the inner side of the piston 33). The driving element 35 is also an annular element and its inner side (the side toward the milling arbor 10) is close to the outer side of the first step spindle 11 of the milling arbor 10, while the outer side of the driving element 35 is in contact with bearing 34. The driving element 35 possesses also a stretching rib 351 on its side toward the bearing 34 and on the other side of it an annular tighten-ring 38 is settled and fixed with it. The protrusion 352 stretching toward the milling arbor 10, which is on the outer side of the driving element 35, is kept fixed by the bolt 381 passing through the tighten-ring 38 and the tail hook 361 of the wedge 36 such that the tighten-ring 38, the inner ring ball race 342 of the bearing 34 and the driving element 35 are fixed with each other and can be regarded as a rigid body. Therefore the driving force of the piston 33 can be transmitted to the driving element 35 by the bearing 34 to push the wedge 36 to move, when the piston 33 drives the outer ring ball race 341 of the bearing 34 to move. Upon the moving direction of the piston 33 it is fully determined, if the wedge 36 will be pushed between the boring arbor 20 and the milling arbor 10 to tighten the arbors 10, 20, or the wedge 36 will be driven back along the axial direction of the milling arbor 10 to loosen the arbors 10, 20.

When the boring arbor 20 and the milling arbor 10 rotate at the same speed, the driving element 35 and the wedge 36 will also rotate at the same speed such that through the design of the bearing 34 described above, the piston 33 enclosing the outer ring ball race 341 of the bearing 34 can still be moved along the axial direction of the milling arbor 10 by the hydraulic force, but cannot be rotated anymore.

From the above detailed description of the embodiment of the present invention it is fully understood, that the milling arbor 10 designed by the present invention can still maintain its structure completeness and makes its structure completeness available and complete for the establishment of cutting tools of milling and fixtures because the milling arbor 10 is designed to possess two steps spindles, i.e., the first step spindle 11 and the second step spindle 12. By the design of the present invention the boring arbor 20 can still completely be supported by the milling arbor 10 while the clamping mechanism 30, which is applied to clamp the boring arbor 20, is settled and fixed with the primary body housing H of boring and milling machines and does not need to support the boring arbor 20.

The invention being thus described will be obvious that is the components or the relations of the components may be varied in many ways. Such variations are not to be regarded as a departure from the spirit and scope of the invention, and all such modifications as would be obvious to one skilled in the art are intended to be included within the scope of the following claims.

What is claimed is:

1. An arbor clamping apparatus for a boring and milling machine, comprising:
    a hollow milling arbor, having:
        a first step spindle having a head part adapted for receiving cutting tools and fixtures; and
        a second step spindle connected with said first step spindle, and having an inner wall;
    a boring arbor disposed in a center hollow space of said milling arbor, and being movable in an axial direction of said milling arbor, and rotatable with said milling arbor and at a same speed thereof; and
    a clamping mechanism, including:
        wedges disposed in a region near where said second step spindle is connected to said first step spindle, and between the inner wall of said second step spindle and the boring arbor, said wedges being movable in the axial direction of said milling arbor;
        a fixed shell that is fixable with a primary body housing of the boring and milling machine, said fixed shell having an annular shape, and enclosing an outside region of said milling arbor, an inner wall of said fixed shell defining a hydraulic chamber;
        an annular piston disposed inside the hydraulic chamber;
        a bearing disposed against an inner wall of said piston; and
        a driving element disposed against the bearing, and surrounding said first step spindle, said driving element being fixed with said wedges such that a motion induced from said piston and said bearings is transmitted to said wedges by way of said driving element, and via an approaching action between said wedges and said boring arbor, a clamping for said boring arbor is achieved;
    wherein said piston has a stretching rib on one side thereof, and which projects toward an axis of said milling arbor, and wherein an annular lid is fixed to said piston at another side thereof.

2. An arbor clamping apparatus in accordance with claim 1, wherein said first step spindle and said second step spindle are both hollow.

3. An arbor clamping apparatus in accordance with claim 1, wherein said first step spindle and said second step spindle are connected with each other with screws and taper pins.

4. An arbor clamping apparatus in accordance with claim 1, wherein the inner wall of said second step spindle, in the region near where said second step spindle is connected to said first step spindle, is tapered.

5. An arbor clamping apparatus in accordance with claim 4, wherein said tapered inner wall has a larger diameter on a side toward said first step spindle, and a shorter diameter on a side away from said first step spindle.

6. An arbor clamping apparatus in accordance with claim 1, wherein said boring arbor has a head part having tap holes for receiving cutting tools.

7. An arbor clamping apparatus for a boring and milling machine, comprising:
    a hollow milling arbor, having:
        a first step spindle having a head part adapted for receiving cutting tools and fixtures; and
        a second step spindle connected with said first step spindle, and having an inner wall;
    a boring arbor disposed in a center hollow space of said milling arbor, and being movable in an axial direction of said milling arbor, and rotatable with said milling arbor and at a same speed thereof; and
    a clamping mechanism, including:
        wedges disposed in a region near where said second step spindle is connected to said first step spindle, and between the inner wall of said second step spindle and the boring arbor, said wedges being movable in the axial direction of said milling arbor;
        a fixed shell that is fixable with a primary body housing of the boring and milling machine, said fixed shell having an annular shape, and enclosing an outside region of said milling arbor, an inner wall of said fixed shell defining a hydraulic chamber;
        an annular piston disposed inside the hydraulic chamber;
        a bearing disposed against an inner wall of said piston; and
        a driving element disposed against the bearing, and surrounding said first step spindle, said driving element being fixed with said wedges such that a motion induced from said piston and said bearings is transmitted to said wedges by way of said driving element, and via an approaching action between said wedges and said boring arbor, a clamping for said boring arbor is achieved;
    wherein the hydraulic chamber is an annular space, which is defined by a slot surrounding the inner wall of said fixed shell, the slot being defined by an annular end covering plate placed between said fixed shell and the primary body housing, the hydraulic chamber being connected with a hydraulic oil supply source by two oil pipes established at two axial sides of the hydraulic chamber.

8. An arbor clamping apparatus in accordance with claim 7, wherein said annular end covering plate has one of said oil pipes therein.

9. An arbor clamping apparatus in accordance with claim 1, wherein said piston is adapted to be reciprocated in the axial direction of said milling arbor in the hydraulic chamber, and wherein an O-Ring is provided between said fixed shell and said piston so as to divide the hydraulic chamber into two unconnected pressure chambers.

10. An arbor clamping apparatus in accordance with claim 1, wherein said piston is disposed adjacent to the inner wall of said fixed shell, and wherein O-Rings are provided between said piston and said fixed shell to seal the hydraulic chamber.

11. An arbor clamping apparatus in accordance with claim 1, wherein said bearing is driven by said piston to push said driving element to cause said driving element to push and move said wedges.

12. An arbor clamping apparatus in accordance with claim 1, wherein said annular lid is fixed to said stretching rib with a bolt, and wherein said annular lid, said stretching rib and an outer ring ball race of said bearing are fixed together.

13. An arbor clamping apparatus for a boring and milling machine, comprising:
 a hollow milling arbor, having:
  a first step spindle having a head part adapted for receiving cutting tools and fixtures; and
  a second step spindle connected with said first step spindle, and having an inner wall;
 a boring arbor disposed in a center hollow space of said milling arbor, and being movable in an axial direction of said milling arbor, and rotatable with said milling arbor and at a same speed thereof; and
 a clamping mechanism, including:
  wedges disposed in a region near where said second step spindle is connected to said first step spindle, and between the inner wall of said second step spindle and the boring arbor, said wedges being movable in the axial direction of said milling arbor;
  a fixed shell that is fixable with a primary body housing of the boring and milling machine, said fixed shell having an annular shape, and enclosing an outside region of said milling arbor, an inner wall of said fixed shell defining a hydraulic chamber;
  an annular piston disposed inside the hydraulic chamber;
  a bearing disposed against an inner wall of said piston; and
  an annular driving element having an outer side disposed in contact with the bearing, and surrounding said first step spindle so that an inner side of said driving element is close to an outer side of said first step spindle, said driving element being fixed with said wedges such that a motion induced from said piston and said bearings is transmitted to said wedges by way of said driving element, and via an approaching action between said wedges and said boring arbor, a clamping for said boring arbor is achieved;
 wherein said driving element has a stretching rib disposed on an inner side thereof, and a protrusion on an outer side thereof, said protrusion extending toward said milling arbor, said protrusion and said stretching rib being disposed on opposite ends of said driving element;
 wherein an annular tighten-ring is fixed to said driving element, and
 wherein said tighten-ring, said protrusion and a tail hook of a respective wedge are fixed together.

14. An arbor clamping apparatus in accordance with claim 13, wherein said annular tighten-ring and said tail hook of said wedge are fixed with said protrusion of said driving element with a bolt.

15. An arbor clamping apparatus in accordance with claim 14, wherein said annular tighten-ring, said rib of said driving element and an inner ball ring race of said bearing are fixed together.

16. An arbor clamping apparatus in accordance with claim 13, wherein said second step spindle of said milling arbor has breaches in the region near where said second step spindle is connected to said first step spindle.

17. An arbor clamping apparatus in accordance with claim 16, wherein said tail hook of said wedge can move in said breach.

* * * * *